(12) United States Patent
Stats

(10) Patent No.: US 6,314,715 B1
(45) Date of Patent: Nov. 13, 2001

(54) MODIFIED FUEL GAS TURBO-EXPANDER FOR OXYGEN BLOWN GASIFIERS AND RELATED METHOD

(75) Inventor: David Andrew Stats, Clifton Park, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/325,174

(22) Filed: Jun. 3, 1999

(51) Int. Cl.[7] ........................................... F02G 3/00
(52) U.S. Cl. ................... 60/39.02; 60/39.12; 60/39.182
(58) Field of Search .................... 60/39.02, 39.12, 60/39.182

(56) References Cited

U.S. PATENT DOCUMENTS

| | | | |
|---|---|---|---|
| 2,675,672 | * | 4/1954 | Schorner ........................ 60/39.12 |
| 4,549,396 | | 10/1985 | Garwood et al. . |
| 4,999,993 | | 3/1991 | Rao . |
| 5,753,198 | * | 5/1998 | Ayala et al. .......................... 423/210 |
| 5,901,547 | * | 5/1999 | Smith et al. ........................ 60/39.02 |

FOREIGN PATENT DOCUMENTS

| | | |
|---|---|---|
| 0 934 904 A2 | 8/1999 | (EP) . |
| 2 191 215 | 12/1987 | (GB) . |
| WO 97/39235 | 10/1997 | (WO) . |
| WO 99/14473 | 3/1999 | (WO) . |

\* cited by examiner

Primary Examiner—Timothy S. Thorpe
Assistant Examiner—E D Hayes
(74) Attorney, Agent, or Firm—Nixon & Vanderhye

(57) ABSTRACT

In a power generating plant including a gas turbine which utilizes fuel gas from an oxygen blown gasifier for combustion at a predetermined pressure to drive a primary load, and where the fuel gas is supplied from the gasifier at a pressure higher than the predetermined pressure, an arrangement is provided to decrease the pressure of the fuel gas to a lower pressure required by the gas turbine. This arrangement includes a combustor and an expander downstream of the combustor, the combustor and the expander located between the gasifier and the gas turbine.

8 Claims, 1 Drawing Sheet

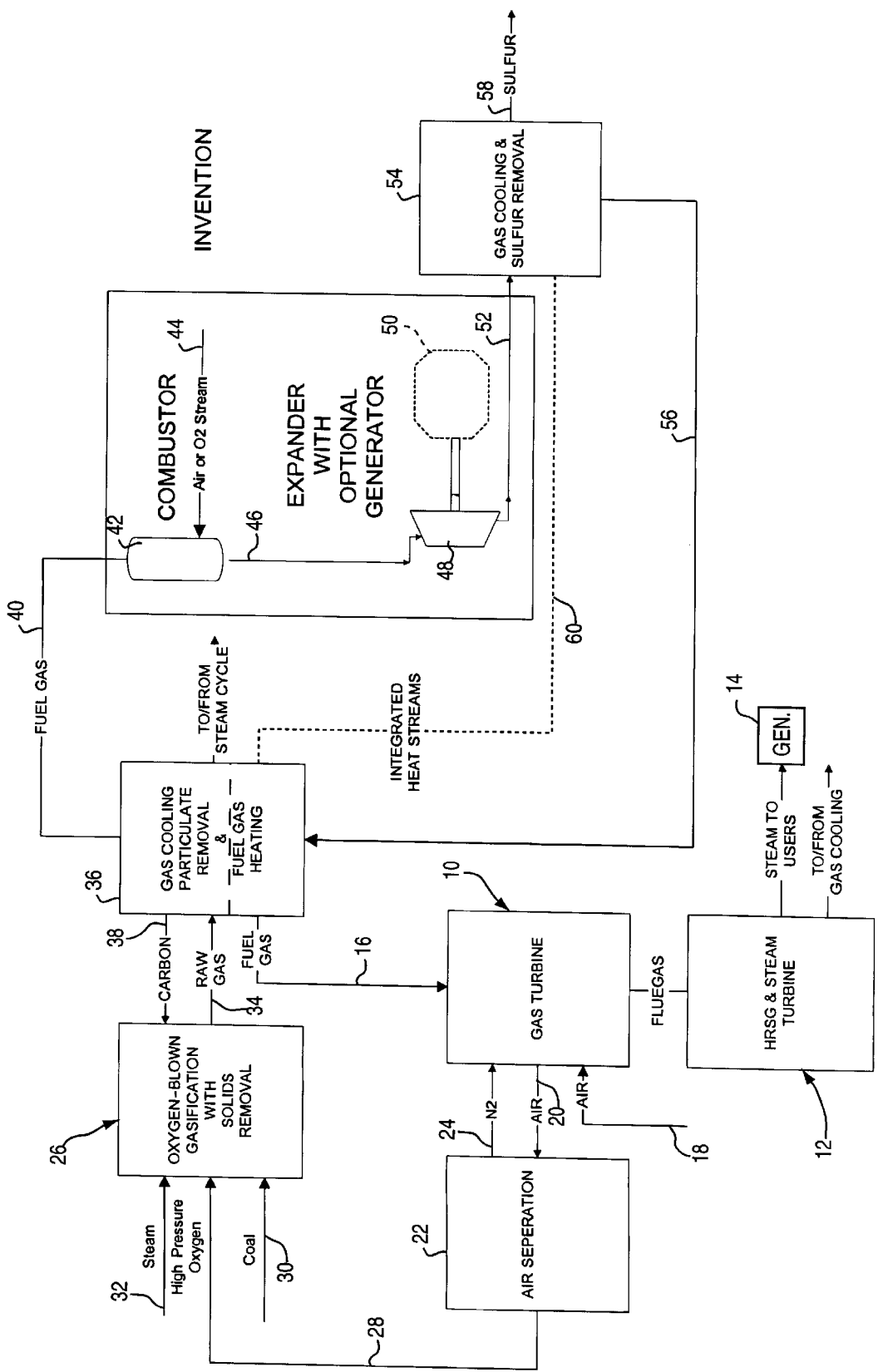

MODIFIED FUEL GAS TURBO-EXPANDER FOR OXYGEN BLOWN GASIFIERS AND RELATED METHOD

BACKGROUND OF THE INVENTION

This invention relates to gas turbines in general, and to integrated coal gasification combined cycle systems in particular.

Integrated gasification combined cycle systems provide flexible operating systems which burn coal in an environmentally acceptable manner. Such systems typically incorporate air blown or oxygen blown gasifiers. For oxygen blown gasifiers, the gasifier optimum pressure is much higher than the fuel pressure required by the gas turbine. In the case of air blown gasifiers, when the power is provided by a motor to compress air for the gasifier, the power requirement lowers the overall plant power output. In the case of oxygen blown gasifiers, power is recovered by installing a power recovery turbine, or turbo expander, in the fuel gas stream and increasing the inlet temperature indirectly using heat exchangers. In accordance with this invention, additional power is recovered by adding a combustor to the expander, and letting the pressure down through the expander and using the power output of the expander to drive a generator or other load.

More specifically, effluent gas from the gasifier is either cooled in a two train syngas cooler (a radiant cooler followed by a convention cooler) or in a quench cooler where water is injected into the cooler. The fuel gas is further treated to remove particulate material. A turbo expander is included to reduce the gas pressure to gas turbine operating pressure, and to recover useful power. Typically, the temperature before the expander needs to be elevated above the cooled temperature for particulate removal and useful heat removal. This has been accomplished in the past by use of heat exchangers and to some extent by including a shift reactor to raise the temperature.

BRIEF SUMMARY OF THE INVENTION

In this invention, a combustor is added upstream of the turbo expander, and a small amount of oxygen is added to the combustor in order to increase the power output of the expander, thereby increasing the amount of useful work, but not adding significantly to the complexity of the system. The reduced pressure fuel gas is then cooled and passed through a sulfur removal system, heated and then supplied to the gas turbine.

Accordingly, in its broader aspects, the present invention is incorporated in a power generating plant including a gas turbine which utilizes fuel gas from an oxygen blown gasifier for combustion at a predetermined pressure to drive a primary load, and where the fuel gas is supplied from the gasifier at a pressure higher than the predetermined pressure, and specifically includes an arrangement to decrease the pressure of the fuel gas to a lower pressure required by the gas turbine comprising a combustor and an expander downstream of the combustor, the combustor and the expander located between the gasifier and the gas turbine.

In another aspect, the invention relates to a method for reducing pressure in fuel gas generated by an oxygen blown gasifier prior to combustion of the fuel gas in a gas turbine, comprising: a) supplying the fuel gas at a pressure higher than required by the gas turbine to a combustor and an expander downstream of the gasifier to thereby reduce the fuel gas pressure; b) removing sulfur from the fuel gas downstream of the expander; c) heating the fuel gas to a predetermined inlet temperature; and d) supplying the fuel gas to the gas turbine at a pressure required by the gas turbine.

BRIEF DESCRIPTION OF THE DRAWINGS

The single drawing figure is a schematic flow diagram of an oxygen blown gasifier incorporated within a combined cycle system.

DETAILED DESCRIPTION OF THE INVENTION

With reference to the Figure, an integrated gasification combined-cycle (IGCC) system includes a gas turbine 10, the exhaust gas of which is used to heat steam in a heat recovery steam generator (HRSG) for a steam turbine, the combined HRSG and steam turbine indicated at 12. The steam turbine typically drives a generator 14 for producing, for example, electric power.

The gas turbine 10 is supplied with fuel gas via line 16 and air via line 18. Air is extracted from the gas turbine compressor via line 20 and supplied to air separator 22, with $N_2$ returned to the gas turbine via line 24, and high pressure oxygen supplied to the gasification/solids removal unit or gasifier 26 via line 28. The $N_2$ supplied to the gas turbine also increases the turbine output.

Gasification/solids removal unit 26 receives coal from line 30 and steam from line 32, along with the high pressure oxygen in line 28. Raw gas exits unit 26 via line 34 and is supplied to the gas cooling/particulate removal and fuel gas heating unit 36. In unit 36, particulate removal results in carbon being recycled to the gasification unit via line 38.

Because the gasifier optimum pressure is much higher than required for the gas turbine fuel pressure, the fuel gas exits unit 36 and is supplied to combustor 42 via line 40, where the fuel gas is mixed with a stream of air or $O_2$ via line 44. The resultant combustion gases are supplied via line 46 to a turbo expander 48 where the gas is reduced to gas turbine operating pressure, and useful power is used to drive an optional generator 50 or other load. The amount of air or $O_2$ supplied to the combustor will vary, depending on the desired power output from the expander. The expanded fuel is supplied via line 52 to a gas cooling/sulfur removal unit 54, with cooled fuel gas returning to the fuel gas heating section of unit 36 via line 56, and sulfur recovered via line 58.

Fuel gas at lower pressure, i.e., at gas turbine operating pressure, is heated to the desired inlet temperature, and then supplied to the gas turbine 10 via line 16.

A conventional (and optional) integrated heat stream is also in place, as indicated by line 60 which extends between the fuel gas heating section of unit 36 and the gas cooling and sulfur removal unit 54.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a power generating plant including a gas turbine which utilizes fuel gas from an oxygen blown gasifier for combustion at a predetermined pressure to drive a primary load, and where the fuel gas supplied from said gasifier is at a pressure higher than the predetermined pressure, an arrangement to decrease the pressure of said fuel gas to a lower pressure required by the gas turbine comprising a combustor and an expander downstream of said combustor, said combustor and said expander located between said gasifier and said gas turbine; said plant further comprising a steam turbine and a heat recovery steam generator where spent steam from the steam turbine is reheated in the heat recovery steam generator by exhaust heat from the gas turbine.

2. The plant according to claim 1 wherein said expander drives a generator.

3. The plant according to claim 1 including means for supplying gas exiting the expander to said gas turbine.

4. The plant according to claim 1 wherein fuel gas entering the combustor is supplied by said oxygen blown gasifier, with a gas cooling and particulate removal unit located between the gasifier and the combustor.

5. The plant according to claim 1 including an air separation unit exchanging $N_2$ and air with said gas turbine.

6. The plant of claim 5 wherein oxygen from said air separation unit is supplied to said gasifier.

7. The plant of claim 1 including means for supplying air or oxygen to said combustor.

8. A power generating plant comprising a gas turbine which utilizes fuel gas from an oxygen blown gasifier for combustion at a predetermined pressure to drive a primary load, and where the fuel gas supplied from said gasifier is at a pressure higher than the predetermined pressure; and means for reducing said higher pressure fuel gas to said predetermined pressure and supplying said fuel gas to said gas turbine; said plant further comprising a steam turbine and a heat recovery steam generator where spent steam from the steam turbine is reheated in the heat recovery steam generator by exhaust heat from the gas turbine.

* * * * *